(12) United States Patent
Antani et al.

(10) Patent No.: US 11,281,654 B2
(45) Date of Patent: Mar. 22, 2022

(54) CUSTOMIZED ROLL BACK STRATEGY FOR DATABASES IN MIXED WORKLOAD ENVIRONMENTS

(75) Inventors: Snehal S. Antani, Hyde Park, NY (US); Soloman J. Barghouthi, Rochester, MN (US); Mohammad N. Fakhar, San Jose, CA (US); Sajan Sankaran, Raleigh, NC (US); Hari Shankar, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2157 days.

(21) Appl. No.: 11/876,953

(22) Filed: Oct. 23, 2007

(65) Prior Publication Data

US 2009/0106326 A1    Apr. 23, 2009

(51) Int. Cl.
*G06F 9/52* (2006.01)
*G06F 16/23* (2019.01)

(52) U.S. Cl.
CPC ................ *G06F 16/2343* (2019.01)

(58) Field of Classification Search
CPC ... G06F 9/524; G06F 13/4036; G06F 16/2343
USPC ............ 707/684, 999.001–999.005, 999.202
See application file for complete search history.

(56) References Cited

U.S. PATENT DOCUMENTS

| | | | |
|---|---|---|---|
| 5,440,743 A | | 8/1995 | Yokota et al. |
| 5,835,766 A | * | 11/1998 | Iba et al. .................. 718/104 |
| 6,041,384 A | | 3/2000 | Waddington et al. |
| 6,807,540 B2 | | 10/2004 | Huras et al. |
| 6,947,952 B1 | * | 9/2005 | Welch et al. |
| 2003/0028638 A1 | * | 2/2003 | Srivastava et al. ........... 709/225 |
| 2006/0206901 A1 | | 9/2006 | Chan |
| 2007/0061487 A1 | * | 3/2007 | Moore et al. ................. 709/246 |

* cited by examiner

*Primary Examiner* — Kannan Shanmugasundaram
(74) *Attorney, Agent, or Firm* — Cuenot, Forsythe & Kim, LLC (57) ABSTRACT

Roll back strategies for database deadlock resolution are customized by identifying a first transaction to a database, identifying a second transaction to the database and detecting a deadlock between the first and second transactions with respect to the database. The deadlock is resolved based upon a predetermined roll back strategy associated with at least one of the first or second transactions to identify a select one of the first and second transactions for roll back and a request is conveyed to roll back the selected one of the first and second transactions, wherein the preferred transaction is allowed to continue processing.

5 Claims, 5 Drawing Sheets

CUSTOMIZED ROLL BACK STRATEGY FOR DATABASES IN MIXED WORKLOAD ENVIRONMENTS

BACKGROUND OF THE INVENTION

The present invention relates in general to database systems, and in particular, to customized roll back strategies for databases in mixed workload environments.

In conventional multi-user database systems, a "deadlock" situation may occur where two or more competing clients are each waiting for another to release a resource. As an example, a first client may require exclusive access to a first table, e.g., to perform edits, record deletions, etc. Thus, the first client may request that a lock be placed on the first table while the first client is performing its necessary operations thereon. Further, a second client may require exclusive access to a second table, e.g., to perform edits, record deletions, etc. Thus, the second client may request that a lock be placed on the second table while the second client is performing its necessary operations thereon. Now, assume that the first client further requires the lock for the second table that is held by the second client and that the second client further requires the lock for the first table that is held by the first client. This may lead to deadlock.

If a deadlock situation occurs, the database server software must resolve the conflict. In this regard, the database server software identifies the deadlock as a problem and resolves the deadlock by selecting one client over the other(s) to maintain processing. The database server further aborts the remainder of the client transactions in deference to the selected client. Moreover, the aborted client transactions are "rolled back". That is, all of the statements within the transaction associated with each aborted client are ignored and the database reverts to the point it was at prior to the start of the aborted transactions.

Modern database implementations use simplistic strategies to decide which transaction(s) to roll back in deadlock scenarios. Generally, the transaction that requires the least amount of overhead to roll back is the transaction that is aborted. For example, if two transactions end up in a deadlock situation, the transaction with the lesser number of locks may be rolled back and the transaction with the greatest number of locks may be allowed to continue processing. From a logical perspective, this strategy makes sense and may be preferable in many scenarios. However, mixed workload environments, such as concurrent batch and online environments require greater flexibility in managing deadlock contention.

BRIEF SUMMARY OF THE INVENTION

According to an aspect of the present invention, a method of implementing database deadlock resolution using custom roll back strategies comprises identifying a first transaction with a database, identifying a second transaction with the database and detecting a deadlock between the first and second transactions with regard to the database. The method further comprises resolving the deadlock based upon a predetermined roll back strategy associated with at least one of the first or second transactions to identify a preferred one of the first and second transactions for continued database processing and to select a remainder one of the first and second transactions for roll back. Still further, the method comprises conveying a request to roll back the selected remainder one of the first and second transactions, wherein the preferred one of the first and second transactions can continue processing. The predetermined roll back strategy may be expressed, for example, in metadata associated with the first and/or second transactions.

According to yet another aspect of the present invention, a method of implementing database deadlock resolution using custom roll back strategies comprises providing a database and providing a database deadlock resolution module coupled to the database. The database is configured to allow multiple simultaneous transactions to access information therein. The database is further capable of assigning locks to transactions that restrict access to locked information to a single transaction. The database deadlock resolution module is configured when executed, for identifying a first transaction with the database, identifying a second transaction with the database and detecting a deadlock between the first and second transactions with respect to the database. The database deadlock resolution module is further configured when executed, for resolving the deadlock based upon a predetermined roll back strategy associated with at least one of the first or second transactions to identify a preferred one of the first and second transactions for continued database processing and to select a remainder one of the first and second transactions for roll back and conveying a request to roll back the selected remainder one of the first and second transactions, wherein the preferred one of the first and second transactions can continue processing.

DETAILED DESCRIPTION OF THE INVENTION

According to various aspects of the present invention, a custom roll back strategy may be established to resolve deadlock conflicts in computing environments. Deadlock conflicts occur, for example, where two transactions have locks on separate objects and each transaction is trying to acquire a lock on the object that the other transaction maintains. Under such conditions, custom roll back strategies specified on transactions, e.g., connections, etc. can instruct the objects as to what action to take when facing a deadlock situation.

Figure 1:
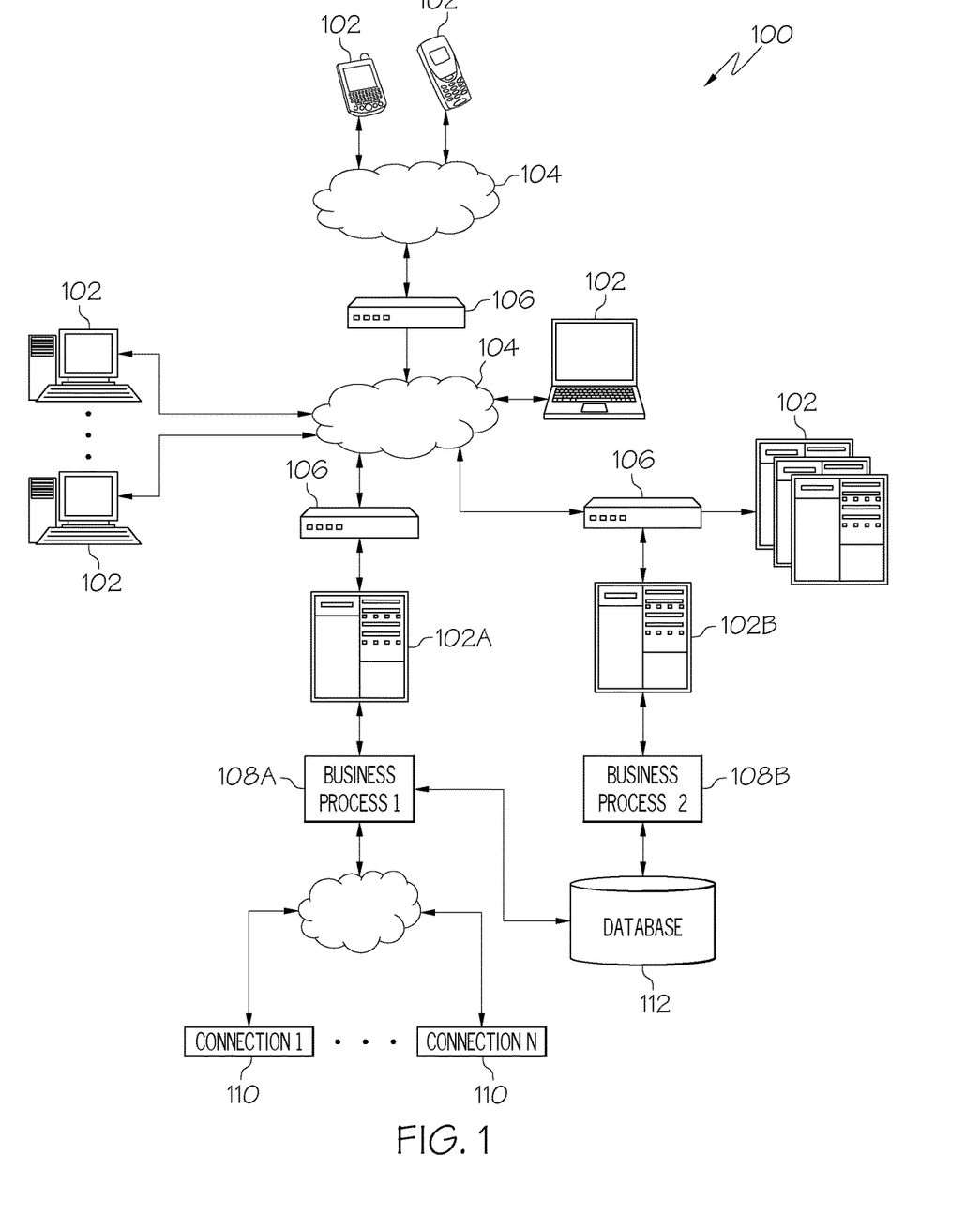
FIG. 1 is a schematic illustration of an exemplary system that may be utilized to implement custom roll back strategies according to various aspects of the present invention.

Referring now to the drawings and particularly to FIG. 1, a general diagram of a computer system 100 is illustrated. The computer system 100 comprises a plurality of hardware and/or software processing devices, designated generally by the reference 102 that are linked together by a network 104. Typical processing devices 102 may include servers, personal computers, notebook computers, transactional systems, purpose-driven appliances, pervasive computing devices such as a personal data assistant (PDA), palm computers, cellular access processing devices, special purpose computing devices, printing and imaging devices, facsimile devices, storage devices and/or other devices capable of communicating over the network 104. The processing devices 102 may also comprise software, including applications and servers that process information stored in various databases, spreadsheets, structured documents, unstructured documents and/or other files containing information.

The network 104 provides communications links between the various processing devices 102, and may be supported by networking components 106 that interconnect the processing devices 102, including for example, routers, hubs, firewalls, network interfaces wired or wireless communications links and corresponding interconnections. Moreover, the network 104 may comprise connections using one or more intranets, extranets, local area networks (LAN), wide area networks (WAN), wireless networks (WIFI), the Internet, including the world wide web, and/or other arrangements for enabling communication between the processing devices 102, in either real time or otherwise, e.g., via time shifting, batch processing, etc. The system 100 is shown by way of illustration, and not by way of limitation, as a computing environment in which various aspects of the present invention may be practiced.

In an illustrative example, assume that a select one of the processing devices, further designated 102A, e.g., a business server, implements a first business process application 108A (BUSINESS PROCESS 1). Still further, for purposes of illustration, assume that another select one of the processing devices, further designated 102B, implements a second business process application 108B (BUSINESS PROCESS 2). The first and second business process applications 108A, 108B may comprise, for example, web-based applications, intermediate applications that interacts with other applications across the network 104, or any other applications, processes, services, etc. that are executed to carry out a business activity, workflow or other action.

Further, assume that the first business process application 108A interacts with clients via one or more client connections 110. For example one or more of the processing devices 102, acting as a client, may log into the first business process application 108A across the network 104 via a corresponding client connection 110. In serving client interactions, the first business process application 108A may also interact with a database 112. Further, assume that from time to time, the second business process application 108B interacts with the database 112.

Figure 2:
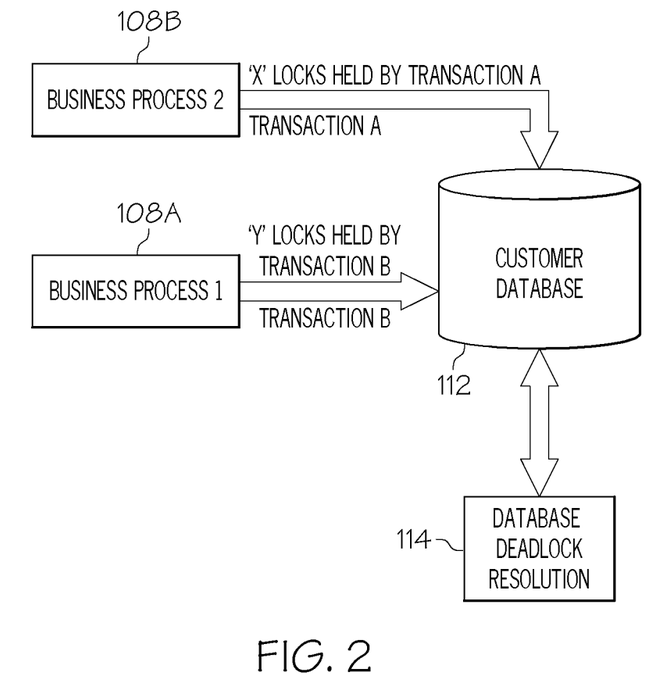
FIG. 2 is a schematic illustration of a deadlock situation.

With reference to FIG. 2, as an illustrative example, assume that the database 112 is a customer accounts database for a banking application. Further assume that the second business process 108B implements a nightly accounts processing batch job that starts a long running transaction, designated as Transaction A. For example, the batch job may execute during "off peak hours" such as by starting at 1:00 am and may process bank transactions corresponding to debits and credits with regard to customer accounts or other activities requiring the second business process application 108B to access the database 112 numerous times. Due to the sheer number of records that require processing, the batch job implemented by the second business process application 108B may require several hours to operate until completion, and may be designed to have longer transaction commit intervals for performance reasons.

To further the above example, assume for exemplary purposes that the first business process application 108A is a server that links customers to the database 112. For example, an important customer may log in to the customer's account using one of the connections 110, e.g., during the "off peak hours", such as 2:00 am, to perform an online banking transaction, designated as Transaction B. At the time that the customer is attempting to perform the online banking transaction, Transaction B, the processing batch job may still be executing Transaction A.

In many conventional database systems where multiple users need to access a database concurrently, a locking arrangement is utilized to prevent data from being corrupted or invalidated when multiple transactions try to write to the database. For example, if the database server comprises a Structured Query Language (SQL) server, a transaction may be defined by SQL statements between a BEGIN WORK command and either a COMMIT command or a ROLL BACK command. The COMMIT command writes the changes in the SQL statements contained between the BEGIN WORK and corresponding COMMIT command to the database. The ROLL BACK command tells the database that all of the statements within the transaction starting from the corresponding BEGIN WORK command should be ignored and the database should revert to the point it was in prior to the start of the transaction.

In a mixed workload environment such as described in the above example, there may be multiple simultaneous attempts to access the database. However, each transaction is typically isolated from the other, so one transaction cannot see the working of another transaction until the first one is complete. In order to isolate one transaction from another, database systems must implement some sort of locking scheme. That is, the database needs a way for one client to lock out (or isolate itself) from all other clients. Depending upon the specific database implementation, locking may be performed at one or more levels of granularity, such as at the database row level, page level (a predetermined block size of data in the database, e.g., a few kilobytes of rows), extents (typically a few pages), entire tables, and entire databases.

Keeping with the current example, assume that Transaction A deadlocks with Transaction B. Transaction B, by its very nature, does not hold as many locks as Transaction A. Thus, under conventional arrangements, a corresponding database deadlock resolution module 114, e.g., a module of the database server, will instruct the database 112 to cancel Transaction B initiated by the first business process application 108A on behalf of the customer and roll back Transaction B as it holds the least number of locks, i.e., X locks>Y locks as shown on the figure. The system may further allow Transaction A to succeed over Transaction B and continue to process. However, this strategy may not serve the best interest of the corresponding business entity, e.g., a bank's business model, because Transaction B represents a customer facing application whereas Transaction A is a background job.

Figure 3:
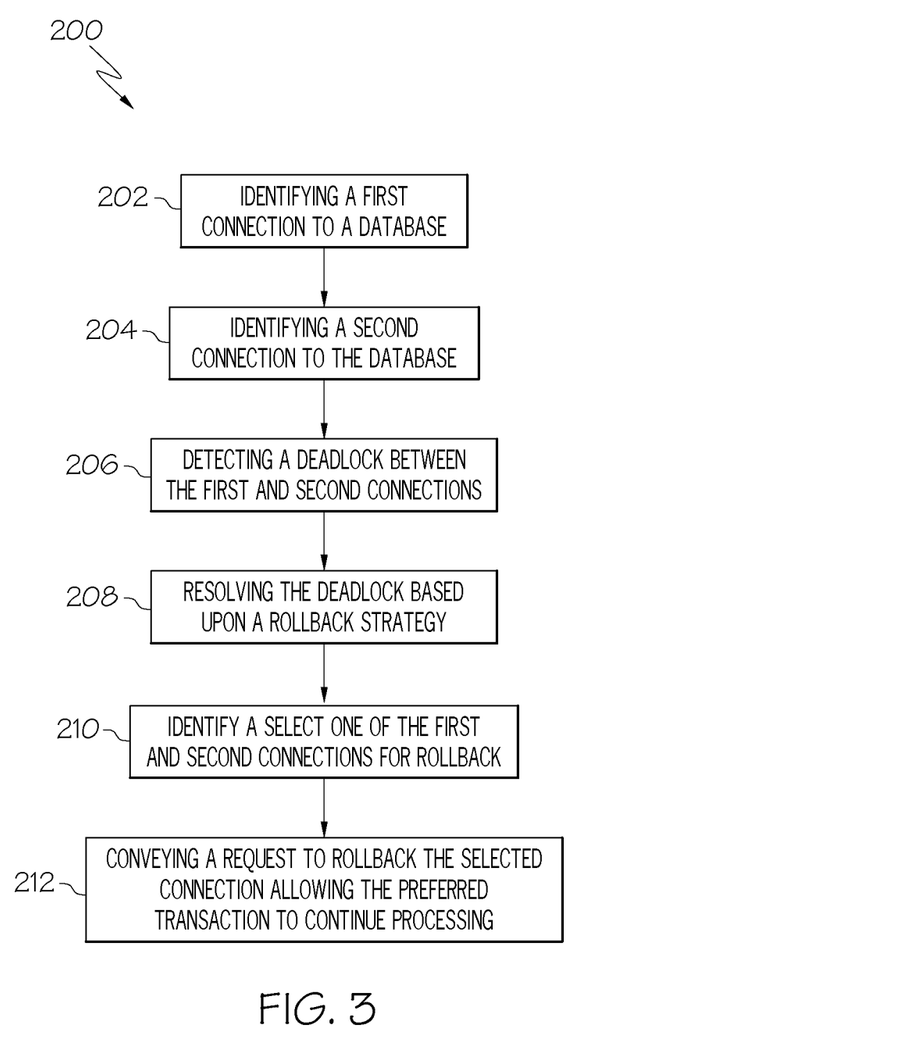
FIG. 3 is a flow chart illustrating a method of implementing a custom roll back strategy according to various aspects of the present invention.

Referring to FIG. 3, a method 200 provides an exemplary approach to implementing custom roll back strategies. The method comprises identifying a first transaction with a database at 202, identifying a second transaction with the database at 204 and detecting a deadlock between the first and second transactions with respect to the database at 206. The method 200 further provides for resolving the deadlock based upon a predetermined roll back strategy associated with at least one of the first or second connections at 208, identifying a preferred one of the first and second transactions for continued database processing and to select a remainder one of the first and second transactions for roll back at 210. The method further comprises conveying a request to roll back the selected remainder one of the first and second connections at 212, thus allowing the preferred transaction to continue processing. According to various aspects of the present invention, the database may utilize custom roll back strategies to select among transactions in a deadlock situation for roll back, and to identify a preferred transaction to continue processing. The rules and policies used to determine the preferred transaction and to select transaction(s) for roll back will depend upon a number of factors, such as the business interests of the business entity.

Figure 4:
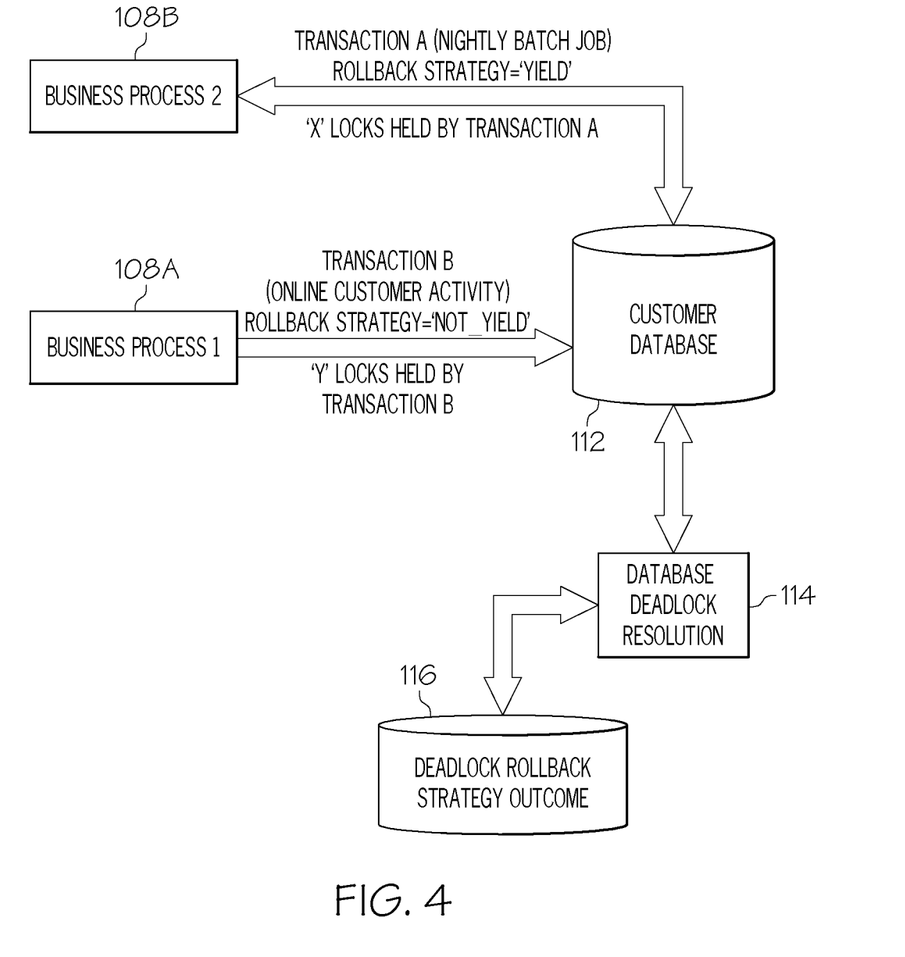
FIG. 4 is a schematic illustration of a deadlock situation that is resolved using a custom roll back strategy according to various aspects of the present invention.

Referring to FIG. 4, keeping with the same example discussed with reference to FIG. 2, it may be in the best interest of the corresponding business entity that customer facing operations take priority over, i.e., are preferred over, bulk processing batch job transactions. Thus, the database 112 should provide priority to the customer facing transaction. In this regard, Transaction A has been assigned a roll back strategy of "YIELD". Similarly, Transaction B has been assigned a roll back strategy of "Not Yield". The roll back strategies specified by Transaction A and Transaction B may be utilized to instruct the database 112, e.g., via the database deadlock resolution module 114, as to what actions should be performed in the event of a deadlock between the two transactions.

Keeping with the above example, assume that a deadlock situation occurs between Transaction A and Transaction B. As noted above, Transaction A has associated therewith, a roll back strategy of "YIELD" and Transaction B has associated therewith, a roll back strategy of "NOT YIELD". The database deadlock resolution module 114 may implement a deadlock resolution rule that, when executed, requires a transaction having a roll back strategy of YIELD to get rolled back if in a deadlock situation with a transaction having a NOT YIELD roll back strategy. Under this arrangement, the customer facing transaction, Transaction B in this example, gets priority over the batch job, Transaction A, regardless of whether Transaction A has more or less locks, i.e., regardless of whether X>Y.

The above exemplary arrangement of using YIELD and NOT YIELD as roll back strategy designations may be applicable to mixed workload scenarios in general. In this regard, the various aspects of the present invention are not limited to batch/online workload situations. Moreover, the roll back strategies according to various aspects of the present invention, provides for a more customizable work environment because the number of locks held is not the only metric for assessing transactional preference in deadlock situations. In this regard, roll back designations other than YIELD/NOT YIELD may be used. Moreover, any number of levels of priority may be established, and the priorities may be further based, conditioned, modified or otherwise manipulated based upon the state of the system, the value of other metrics, rules, algorithms, etc.

According to various aspects of the present invention, roll back strategies are designated using roll back strategy metadata, e.g., by specifying the roll back strategy as transaction metadata. As another example, the roll back strategy metadata may be specified in metadata using an applications programming interface, such as where the roll back strategy metadata is specified by a database client.

As an illustrative example, the roll back strategy metadata may be specified by an extended markup language (XML) file such as illustrated in the below pseudo-code:

```
<roll back-metadata>
    <strategy>Yield</strategy>
</roll back-metadata>
```

As another illustrative example, the roll back strategy metadata for a database client may be specified by an XML file such as illustrated in the below pseudo-code:

Connection conn=DriverMAnager.getConnection( . . . )
Conn.setRoll backStrategy(Connection.YIELD);

In certain circumstances, two transactions may result in a deadlock, where both transactions share the same roll back transaction metadata. Under such an arrangement, alternative metrics, rules, algorithms, states or other factors may be utilized to resolve the stalemate. For example, Table A illustrates several representative outcomes as a result between two transactions in a system having roll back strategy metadata that can comprise one of two states, YIELD and NOT YIELD. The data in Table A is presented for illustrative purposes, and other transaction priorities and deadlock outcomes may be specified in practical implementations.

TABLE A

Behavior Matrix for Transactions With Roll back Strategy Metadata:

| TRANSACTION A | TRANSACTION B | DEADLOCK OUTCOME |
| --- | --- | --- |
| YIELD | NOT YIELD | TRANSACTION A ROLLS BACK |
| YIELD | YIELD | TRANSACTION WITH LEAST NUMBER OF LOCKS ROLLS BACK |
| NOT YIELD | NOT YIELD | TRANSACTION WITH LEAST NUMBER OF LOCKS ROLLS BACK |
| NOT YIELD | YIELD | TRANSACTION B ROLLS BACK |
| NO METADATA | NOT YIELD | TRANSACTION A ROLLS BACK |
| NO METADATA | YIELD | TRANSACTION B ROLLS BACK |
| YIELD | NO METADATA | TRANSACTION A ROLLS BACK |
| NOT YIELD | NO METADATA | TRANSACTION B ROLLS BACK |
| NO METADATA | NO METADATA | TRANSACTION WITH LEAST NUMBER OF LOCKS ROLLS BACK |

As an illustrative example, the database deadlock resolution module 114 may resolve a deadlock based upon a predetermined roll back strategy associated with at least one of the first or second transactions to identify a select one of the first and second transactions for roll back by identifying a first roll back strategy associated with the first transaction if available, identifying a second roll back strategy associated with the second transaction if available and evaluating the first and/or second roll back strategies to determine a priority between the first and second transactions. In this regard, the database deadlock resolution module 114 may consult a behavior matrix for transactions with roll back strategy metadata, such as illustrated in Table A shown above.

As noted in Table A, if Transaction A has a roll back strategy of Yield and Transaction B has a roll back strategy of NOT YIELD, then the database resolution module 114 identifies Transaction A for roll back and Transaction B is treated as the preferred transaction for continued processing. If Transaction A has a roll back strategy of YIELD and Transaction B has a roll back strategy of YIELD, then the transaction with the least number of locks will be identified for roll back and the transaction with the most number of locks is treated as the preferred transaction for continued processing.

If Transaction A has a roll back strategy of NOT YIELD and Transaction B has a roll back strategy of NOT YIELD, then the transaction with the least number of locks will be identified for roll back and the transaction with the most number of locks is treated as the preferred transaction for continued processing. If Transaction A has a roll back strategy of NOT YIELD and Transaction B has a roll back strategy of YIELD, then the Transaction B will be identified for roll back and Transaction A is treated as the preferred transaction for continued processing.

If Transaction A has no roll back strategy metadata and Transaction B has a roll back strategy of NOT YIELD, then the Transaction A will be identified for roll back and Transaction B is treated as the preferred transaction for continued processing. If Transaction A has no roll back metadata and Transaction B has a roll back strategy of YIELD, then the Transaction B will be identified for roll back and Transaction A is treated as the preferred transaction for continued processing.

If Transaction A has a roll back strategy of YIELD and Transaction B has a no roll back strategy metadata, then the Transaction A will be identified for roll back and Transaction B is treated as the preferred transaction for continued processing. If Transaction A has a roll back strategy of NOT YIELD and Transaction B has no roll back strategy metadata, then the Transaction B will be identified for roll back and Transaction A is treated as the preferred transaction for continued processing. Finally, if neither Transaction A nor Transaction B have roll back strategy metadata, then the transaction with the least number of locks will be identified for roll back and the transaction with the most number of locks is treated as the preferred transaction for continued processing.

Thus, the database deadlock resolution module 114 may resolve a deadlock based upon a predetermined roll back strategy associated with at least one of the first or second transactions to identify a select one of the first and second transactions for roll back. If the roll back strategy cannot determine priority of a deadlock based upon a first metric, e.g., a roll back priority designation such as YIELD and NOT YIELD, then one or more fallback factors are considered, such as by evaluating the number of locks associated with each of the first and second transactions, or by considering any other reasonable factors.

The above exemplary YIELD and NOT YIELD roll back metadata is shown by way of illustration and not by way of limitation. For example, the concepts herein may be extended to situations where more than two transactions collectively deadlock. Under the above situation, it may be sufficient to clearly identify a single transaction to as having priority, which is allowed to continue processing and roll back the remainder of the transactions. Also, more than two roll back metadata types may be specified. For example, prioritized roll back strategies may be devised, e.g., on a scale, etc. which may be utilized to determine which one of N transactions (where N is any integer) is the most preferred and hence should not be rolled back.

Thus, the database deadlock resolution module 114 may identify at least one additional transaction to the database that is deadlocked with the first and second transactions, define the predetermined roll back strategy to include multiple priorities so as to identify a select one transaction to maintain priority to access the database and convey a request to roll back the remainder of the transactions.

Figure 5:
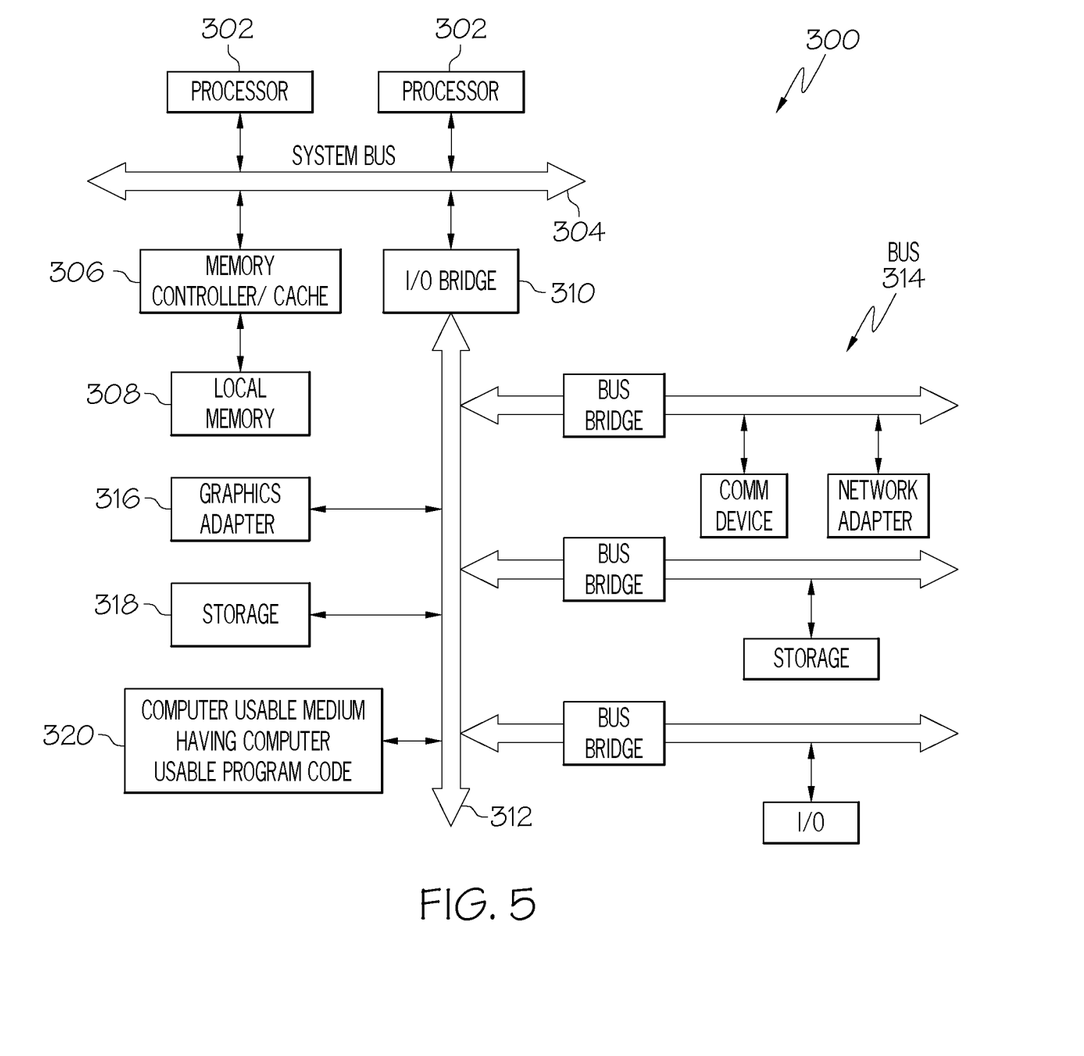
FIG. 5 is a block diagram of an exemplary computer system including a computer usable medium having computer usable program code embodied therewith, where the exemplary computer system is capable of executing a computer program product to implement dynamic roll back strategies according to various aspects of the present invention.

Referring to FIG. 5, a block diagram of a data processing system is depicted in accordance with the present invention. Data processing system 300, such as one of the processing devices 102 described with reference to FIG. 1, may comprise a symmetric multiprocessor (SMP) system or other configuration including a plurality of processors 302 connected to system bus 304. Alternatively, a single processor 302 may be employed. Also connected to system bus 304 is memory controller/cache 306, which provides an interface to local memory 308. An I/O bus bridge 310 is connected to the system bus 204 and provides an interface to an I/O bus 312. The I/O bus may be utilized to support one or more busses and corresponding devices 314, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 316, storage 218 and a computer usable storage medium 320 having computer usable program code embodied thereon. The computer usable program code may be executed to execute any aspect of the present invention, for example, to implement any aspect of any of the methods and/or system components illustrated in FIGS. 1-4. Moreover, the computer usable program code may be utilized to implement the database deadlock resolution module 114 or any other processes that are used to perform custom roll back strategies as set out further herein.

The data processing system depicted in FIG. 5 may be, for example, an IBM RS/6000 system, a product of International Business Machines Corporation in Armonk, N.Y., running the Advanced Interactive Executive (AIX) operating system. An object oriented programming system such as Java may run in conjunction with the operating system and provides calls to the operating system from Java programs or applications executing on data processing system.

The various aspects of the present invention may be embodied as systems, computer-implemented methods and computer program products. Also, various aspects of the present invention may take the form of an entirely hardware embodiment, an entirely software embodiment (including software, firmware, micro-code, etc.) or an embodiment combining software and hardware, wherein the embodiment or aspects thereof may be generally referred to as a "circuit," "component" or "system." Furthermore, the various aspects of the present invention may take the form of a computer program product on a computer-usable storage medium having computer-usable program code embodied in the medium or a computer program product accessible from a computer-usable or computer-readable medium providing program code for use by or in connection with a computer or any instruction execution system.

The software aspects of the present invention may be stored, implemented and/or distributed on any suitable computer usable or computer readable medium(s). For the purposes of this description, a computer-usable or computer readable medium can be any apparatus that can contain, store, communicate, propagate, or transport the program for use by or in connection with the instruction execution system, apparatus, or device. The computer program product aspects of the present invention may have computer usable or computer readable program code portions thereof, which are stored together or distributed, either spatially or temporally across one or more devices. A computer-usable or computer-readable medium may comprise, for example, an electronic, magnetic, optical, electromagnetic, infrared, or semiconductor system, apparatus, device, or propagation medium. As yet further examples, a computer usable or computer readable medium may comprise cache or other memory in a network processing device or group of networked processing devices such that one or more processing devices stores at least a portion of the computer program product. The computer-usable or computer-readable medium may also comprise a computer network itself as the computer program product moves from buffer to buffer propagating through the network. As such, any physical memory associated with part of a network or network component can constitute a computer readable medium.

More specific examples of the computer usable or computer readable medium comprise for example, a semiconductor or solid state memory, magnetic tape, an electrical connection having one or more wires, a swappable intermediate storage medium such as floppy drive or other removable computer diskette, tape drive, external hard drive, a portable computer diskette, a hard disk, a rigid magnetic disk, a random access memory (RAM), a read-only memory (ROM), an erasable programmable read-only memory (EPROM or Flash memory), a portable compact disc read-only memory (CD-ROM), a read/write (CD-R/W) or digital video disk (DVD), an optical fiber, disk or storage device, or a transmission media such as those supporting the Internet or an intranet. The computer-usable or computer-readable medium may also comprise paper or another suitable medium upon which the program is printed or otherwise encoded, as the program can be captured, for example, via optical scanning of the program on the paper or other medium, then compiled, interpreted, or otherwise processed in a suitable manner, if necessary, and then stored in a computer memory. The computer-usable medium may include a propagated data signal with the computer-usable program code embodied therewith, either in baseband or as part of a carrier wave or a carrier signal. The computer usable program code may also be transmitted using any appropriate medium, including but not limited to the Internet, wire line, wireless, optical fiber cable, RF, etc.

Computer program code for carrying out operations of the present invention may be written in any suitable language, including for example, an object oriented programming language such as Java, Smalltalk, C++ or the like. The computer program code for carrying out operations of the present invention may also be written in conventional procedural programming languages, such as the "C" programming language, or in higher or lower level programming languages. The program code may execute entirely on a single processing device, partly on one or more different processing devices, as a stand-alone software package or as part of a larger system, partly on a local processing device and partly on a remote processing device or entirely on the remote processing device. In the latter scenario, the remote processing device may be connected to the local processing device through a network such as a local area network (LAN) or a wide area network (WAN), or the connection may be made to an external processing device, for example, through the Internet using an Internet Service Provider.

The present invention is described with reference to flowchart illustrations and/or block diagrams of methods, apparatus systems and computer program products according to embodiments of the invention. It will be understood that each block of the flowchart illustrations and/or block diagrams, and combinations of blocks in the flowchart illustrations and/or block diagrams may be implemented by system components or computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention may be practiced on any form of computer system, including a stand alone computer or one or more processors participating on a distributed network of computers. Thus, computer systems programmed with instructions embodying the methods and/or systems disclosed herein, or computer systems programmed to perform various aspects of the present invention and storage or storing media that store computer readable instructions for converting a general purpose computer into a system based upon the various aspects of the present invention disclosed herein, are also considered to be within the scope of the present invention. Once a computer is programmed to implement the various aspects of the present invention, including the methods of use as set out herein, such computer in effect, becomes a special purpose computer particular to the methods and program structures of this invention. The techniques necessary for this are well known to those skilled in the art of computer systems.

The flowchart and block diagrams in the Figures illustrate the architecture, functionality, and operation of possible implementations of systems, methods and computer program products according to various embodiments of the present invention. In this regard, one or more blocks in the flowchart or block diagrams may represent a component, segment, or portion of code, which comprises one or more executable instructions for implementing the specified logical function(s). In some alternative implementations, the functions noted in the blocks may occur out of the order noted in the figures. For example, two blocks shown in succession may, in fact, be executed substantially concurrently or in the reverse order.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A computer-implemented method of implementing database deadlock resolution, comprising:
    detecting a deadlock between first and second transactions with respect to a database;
    obtaining transaction metadata that
        is associated with one of the first and second transactions and
        designates a predetermined roll back strategy associated with the one transaction;
    evaluating the designated predetermined roll back strategy within the transaction metadata;
    resolving the deadlock based upon the evaluating;
    continuing processing of a preferred one of the first and second transactions based upon the resolving; and
    generating a roll back request to a non-preferred one of the first and second transactions based upon the resolving, wherein
    the predetermined roll back strategy includes an instruction for an action to be performed,
    one of the first and second transactions is associated with the transaction metadata,
    a second of the first and second transactions is not associated with any transaction metadata, and
    the resolving the deadlock is governed by the transaction metadata associated with the one of the first and second transactions.

2. The method of claim 1, wherein
the predetermined roll back strategy is selected from:
    a first roll back strategy designating a transaction as yielding to other transaction(s), and
    a second roll back strategy designating the transaction as not yield to the other transaction(s).

3. A computer hardware system configured to implement database deadlock resolution, comprising:
    a hardware computer configured to initiate the following executable operations:
        detecting a deadlock between first and second transactions with respect to a database;
        obtaining transaction metadata that
            is associated with one of the first and second transactions and
            designates a predetermined roll back strategy associated with the one transaction;
        evaluating the designated predetermined roll back strategy within the transaction metadata;
        resolving the deadlock based upon the evaluating;
        continuing processing of a preferred one of the first and second transactions based upon the resolving; and
        generating a roll back request to a non-preferred one of the first and second transactions based upon the resolving, wherein
    the predetermined roll back strategy includes an instruction for an action to be performed,
    one of the first and second transactions is associated with the transaction metadata,
    a second of the first and second transactions is not associated with any transaction metadata, and
    the resolving the deadlock is governed by the transaction metadata associated with the one of the first and second transactions.

4. The system of claim 3, wherein
the predetermined roll back strategy is selected from:
    a first roll back strategy designating a transaction as yielding to other transaction(s), and
    a second roll back strategy designating the transaction as not yield to the other transaction(s).

5. A computer program product, comprising:
a hardware storage device having stored therein program instructions,
the program instructions, which when executed by computer hardware system configured to implement database deadlock resolution, causes the computer hardware system to perform:
    detecting a deadlock between first and second transactions with respect to a database;
    obtaining transaction metadata that
        is associated with one of the first and second transactions and
        designates a predetermined roll back strategy associated with the one transaction;
    evaluating the designated predetermined roll back strategy within the transaction metadata;
    resolving the deadlock based upon the evaluating;
    continuing processing of a preferred one of the first and second transactions based upon the resolving; and
    generating a roll back request to a non-preferred one of the first and second transactions based upon the resolving, wherein
    the predetermined roll back strategy includes an instruction for an action to be performed,
    one of the first and second transactions is associated with the transaction metadata,
    a second of the first and second transactions is not associated with any transaction metadata, and
    the resolving the deadlock is governed by the transaction metadata associated with the one of the first and second transactions.

* * * * *